Sept. 8, 1925.
H. W. DAVIS
NUT LOCK
Filed May 5, 1925
1,552,681
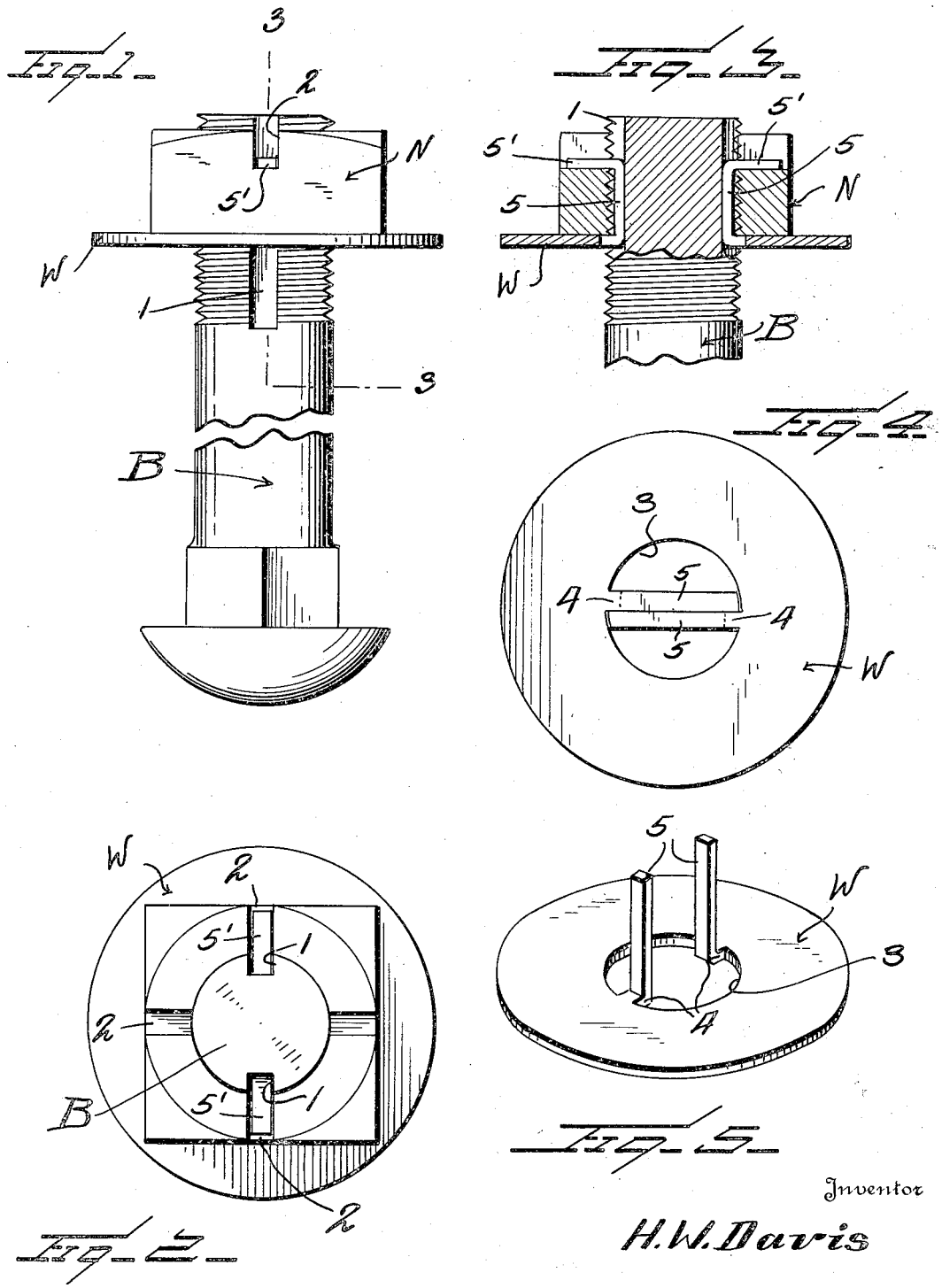
Inventor
H. W. Davis
By Watson E. Coleman
Attorney Patented Sept. 8, 1925.

1,552,681

UNITED STATES PATENT OFFICE.

HENRY W. DAVIS, OF ROCK SPRINGS, WYOMING.

NUT LOCK.

Application filed May 5, 1925. Serial No. 28,205.

*To all whom it may concern:*

Be it known that I, HENRY W. DAVIS, a citizen of the United States, residing at Rock Springs, in the county of Sweetwater and State of Wyoming, have invented certain new and useful Improvements in Nut Locks, of which the following is a specification, reference being had to the accompanying drawings.

This invention relates to certain improvements in nut locks and it is an object of the invention to provide novel and improved means whereby retrograde rotation of the nut with respect to the bolt is effectively prevented.

It is also an object of the invention to provide means for coupling a nut and bolt comprising a washer having its inner marginal portion provided with arms adapted to interlock with the bolt and applied nut.

The invention consists in the details of construction and in the combination and arrangement of the several parts of my improved nut lock whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view in elevation illustrating a bolt and nut coupled in accordance with an embodiment of my invention;

Figure 2 is a view in top elevation of the structure as illustrated in Figure 1;

Figure 3 is a sectional view taken substantially on the line 3—3 of Figure 1 with parts in elevation;

Figure 4 is a view in top plan of the lock washer as herein disclosed with the arms in their initial position;

Figure 5 is a view in perspective of the lock washer as herein disclosed with the arms arranged in their normal working position.

As disclosed in the accompanying drawings, B denotes a bolt having its threaded peripheral portion provided with the longitudinally disposed grooves 1, said grooves being herein shown as two in number and diametrically opposed. Threaded upon the bolt B is a nut N the outer face of which being provided with the radial slots 2 herein disclosed as four in number and equidistantly spaced. The lock washer W is provided with a central opening 3 through which is adapted to be inserted the outer or threaded portion of the bolt B, the wall of said opening being provided with the inwardly extending and radially disposed short arms 4 which are received within the grooves 1 of the bolt B. The outer end portions of these arms 4 are continued by the elongated arms 5 substantially at right angles thereto and which, when the washer W is applied to the bolt B, are received in the grooves 1. The grooves 1 are of a depth greater than the thickness of the arms 5 so that when the washer W and nut N are first engaged with the bolt B said arms 5 will offer no hindrance or obstruction to the requisite rotation of the nut N to effect the requisite engagement with the work, it being understood that the washer W will contact with such work.

After the nut N has been properly adjusted or set, the outer end portions 5' of the arms 5 are bent outwardly to seat within opposed radial slots 2 in the nut N whereby said nut is effectively locked against retrograde or back rotation.

While I have herein shown the washer W provided with a pair of arms 4 and 5 it is to be understood that only a single arm 4 and 5 may be employed.

As particularly illustrated in Figure 4, the combined length of each of the arms 4 and 5 is substantially equal to the diameter of the central opening 3 of the washer W and said arms initially are laterally offset one with respect to the other so that said washer and the required arms may be readily produced by a single punching or cutting operation.

From the foregoing description it is thought to be obvious that a nut lock constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. A lock washer comprising a body member having a central opening, arms extending inwardly of the central opening from opposite points in the wall thereof, said arms being adapted to lie along side portions of each other when the arms are in coplanar relation with said body member.

2. A lock washer comprising a body member having a central opening, arms extending inwardly of the central opening from opposite points in the wall thereof, said arms being adapted to lie longitudinally in positions oppositely disposed from the center of the central opening but in proximity to each other.

3. A nut lock comprising, in combination, a grooved bolt, a nut engageable with the bolt and having slots in its outer face, and a lock washer positioned upon the bolt inwardly of the nut, said washer having arms extending inwardly of its central opening to engage within grooves of the bolt, said arms being so disposed that the extensions of their center-lines would pass the center of said central opening on opposite sides thereof, said arms being continued by elongated arms also extending within the grooves of the bolt, said elongated arms being of a length to permit their outer end portions to be flexed within the slots of the nut, the slots of the nut being radially disposed and the grooves of the bolt being diametrically opposed.

In testimony whereof I hereunto affix my signature.

HENRY W. DAVIS.